United States Patent
Gautier et al.

(10) Patent No.: US 11,940,046 B2
(45) Date of Patent: Mar. 26, 2024

(54) ACTUATOR FOR THE ACTUATION OF AT LEAST ONE MOVABLE MEMBER, IN PARTICULAR FOR CHANGING GEAR RATIOS IN A MOTOR VEHICLE TRANSMISSION

(71) Applicant: VALEO SYSTEMES DE CONTROLE MOTEUR, Cergy Pontoise (FR)

(72) Inventors: Sylvain Gautier, Cergy Pontoise (FR); Dominique Gilet, Cergy Pontoise (FR); Vincent Bazin, Cergy Pontoise (FR)

(73) Assignee: VALEO SYSTEMES DE CONTROLE MOTEUR, Cergy Pontoise (FR)

( * ) Notice: Subject to any disclaimer, the term of this patent is extended or adjusted under 35 U.S.C. 154(b) by 0 days.

(21) Appl. No.: 17/658,958

(22) Filed: Apr. 12, 2022

(65) Prior Publication Data

US 2022/0325793 A1    Oct. 13, 2022

(30) Foreign Application Priority Data

Apr. 13, 2021    (FR) ...................................... 21 03790

(51) Int. Cl.
*F16H 63/30* (2006.01)
*F16H 61/00* (2006.01)
(Continued)

(52) U.S. Cl.
CPC ....... *F16H 63/304* (2013.01); *F16H 61/0006* (2013.01); *F16H 61/32* (2013.01); *F16H 2061/005* (2013.01); *F16H 2061/2892* (2013.01)

(58) Field of Classification Search
CPC .... F16H 63/304; F16H 61/0006; F16H 61/32; F16H 2061/005; F16H 2061/2892; F16H 1/0202; F16H 61/0211; H01R 13/5219
See application file for complete search history.

(56) References Cited

U.S. PATENT DOCUMENTS

| | | | | |
|---|---|---|---|---|
| 6,113,407 A | * | 9/2000 | Martin | ...................... H01R 4/60 439/205 |
| 6,155,126 A | * | 12/2000 | Vogt | ........................ F16H 61/32 74/335 |

(Continued)

FOREIGN PATENT DOCUMENTS

| | | |
|---|---|---|
| CN | 210397685 U | 4/2020 |
| EP | 1 094 253 B1 | 11/2008 |

OTHER PUBLICATIONS

French Preliminary Search Report dated Oct. 19, 2021 in French Application 21 03790 filed on Apr. 13, 2021(with English Translation of Categories of Cited Documents & Written Opinion), 12 pages.

(Continued)

*Primary Examiner* — Zakaria Elahmadi
(74) *Attorney, Agent, or Firm* — Oblon, McClelland, Maier & Neustadt, L.L.P.

(57) ABSTRACT

An actuator for the actuation of at least one movable member of a motor vehicle transmission. The actuator includes a housing and a cover defining an internal volume in which are received at least one electric motor having a stator and a rotor mounted on a rotor shaft extending along an axis X1, a motor pinion fixed to the opposite end of the shaft from the rotor, a circuit board for supplying power to the stator and controlling the electric motor, and a reduction mechanism driven by the motor pinion. The housing or the cover includes an electrical connector which incorporates a (Continued)

semipermeable membrane allowing an exchange of gas between the inside of the actuator and the external surroundings.

18 Claims, 7 Drawing Sheets

(51) Int. Cl.
*F16H 61/32* (2006.01)
*F16H 61/28* (2006.01)

(56) References Cited

U.S. PATENT DOCUMENTS

| | | | | |
|---|---|---|---|---|
| 6,210,191 | B1* | 4/2001 | Sai | H01R 13/5221 |
| | | | | 439/198 |
| 6,367,344 | B1* | 4/2002 | Vogt | F16H 59/70 |
| | | | | 74/335 |
| 2011/0126657 | A1* | 6/2011 | Ganter | F16H 61/12 |
| | | | | 74/473.12 |
| 2015/0099385 | A1* | 4/2015 | Ikeya | H01R 12/75 |
| | | | | 439/271 |
| 2016/0254719 | A1* | 9/2016 | Pondelek | F16H 57/0476 |
| | | | | 310/54 |
| 2016/0268875 | A1* | 9/2016 | Roos | H02K 5/10 |
| 2019/0107197 | A1* | 4/2019 | Pezzotta | F16H 61/32 |
| 2021/0351682 | A1* | 11/2021 | Mellere | H02K 37/24 |

OTHER PUBLICATIONS

Extended European Search Report dated Aug. 3, 2022 in European Patent Application No. 22167542.4, 9 pages.

* cited by examiner

ACTUATOR FOR THE ACTUATION OF AT LEAST ONE MOVABLE MEMBER, IN PARTICULAR FOR CHANGING GEAR RATIOS IN A MOTOR VEHICLE TRANSMISSION

BACKGROUND

The invention relates to an actuator for the actuation of at least one movable member. It is applicable in particular in the field of actuators for motor vehicle transmissions. However, numerous other applications are possible.

More specifically, the invention relates to an actuator for changing gear ratios in a motor vehicle transmission or gearbox. Such an actuator finds use in a hybrid transmission of a motor vehicle, having for the one part a driving combustion engine and for the other part an electric machine.

There is a need to change the gear ratios of the transmission in order that the combustion engine and/or the electric machine operate in their optimum range of use. The actuator according to the invention performs this function.

An actuator for changing gear ratios in a gearbox comprising an electric motor and a fork spindle which is moved axially to engage or disengage a gear ratio of the gearbox is known from document WO2018/146393A1. This actuator has step-down means for demultiplying rotational movement between the output shaft of the electric motor and a pin which is offset with respect to the axis of rotation of the electric motor, the pin being engaged in an oblong opening in a claw system so as to bring about the axial movement of the fork spindle in linear travel along the opening under the action of the electric motor.

This solution has the drawback of providing a bulky step-down means, this going against the objectives of the automotive industry aiming to reduce the weight and size of components. Moreover, the aforementioned document does not provide any means for controlling the electric motor.

BRIEF SUMMARY

The subject of the present invention is to improve the current solutions, in particular by providing a solution having the aim of making such an actuator for changing gear ratios of a motor vehicle transmission as compact as possible whilst still integrating a means for controlling the electric motor.

The term "transmission" is synonymous with a gearbox of a motor vehicle.

More particularly, the invention relates to an actuator for the actuation of at least one movable member of a motor vehicle transmission, said actuator comprising a housing and a cover defining an internal volume in which are received at least one electric motor having a stator and a rotor mounted on a rotor shaft extending along an axis X1, a motor pinion fixed to the opposite end of the shaft from the rotor, a circuit board for supplying power to the stator and controlling the electric motor, a reduction mechanism driven by the motor pinion, the housing or the cover comprises an electrical connector which incorporates a semipermeable membrane allowing an exchange of gas between the inside of the actuator and the external surroundings.

Therefore, an actuator according to the invention will be able to solve the problems set out above. In particular, positioning the membrane on the electrical connector makes it possible to simplify the design of the housing or of the cover.

According to the invention, the membrane is semipermeable, that is to say that it is permeable to gases, in particular air, and impermeable to liquids, in particular water or oil. This exchange makes it possible to balance the pressure inside the actuator due to the release of heat linked to the circuit board and to the electric motor.

According to one feature of the invention, the housing and the cover are made of metal. Preferably, the housing and the cover are made of aluminium, for example die-cast aluminium.

According to another feature of the invention, the electrical connector is made of plastic. It is especially advantageous to position the membrane on a plastic element. Moreover, positioning the membrane on the plastic electrical connector is simpler from a manufacturing perspective than positioning the membrane on the metal housing or cover. This is because it is easier to create complex shapes on a plastic part that make it possible to retain the membrane, this being impossible with a metallic part. These complex shapes can for example protect access to the membrane.

In the field of automotive actuators, it is advantageous to use standard elements in order to reduce costs; the use of an electrical connector incorporating a membrane also allows it to be used in various types of actuators.

Preferably, the electrical connector with its membrane is positioned on the support element, specifically the cover or the housing, which is located on the upper part of the actuator.

According to an exemplary embodiment of the invention, the membrane is clipped on the electrical connector by way of a ring. As an alternative, the membrane is adhesively bonded or welded on the electrical connector.

Preferably, the electrical connector has a substantially circular shape. A seal is positioned between the electrical connector and the housing or the cover, and the seal is preferably an O-ring.

According to the invention, the electrical connector is screwed on the housing or the cover. As a variant, the electrical connector is clipped on the housing or the cover.

According to one feature of the invention, the housing and the cover each have guide means for guiding the reduction mechanism.

According to the invention, the housing comprises a peripheral groove in which a seal is disposed in order to ensure leaktightness between the housing and the cover.

Preferentially, the actuator is able to be fixed directly on the transmission of the vehicle and the outer surface of the cover has a groove in which a seal is positioned in order to ensure leaktightness between the transmission and the cover of the actuator.

Advantageously, the actuator comprises at least one pin that is able to be engaged in a movable member of the transmission. The pin is located on the outside of the cover and as a result on the outside of the actuator. The pin may have a shape which interacts with the movable member, for example a conical shape or as a variant, a spherical shape.

The pin is able to be engaged in an opening, for example an oblong opening, so as to bring about the axial movement of a fork in linear travel along the opening under the action of the electric motor. The pin is able to travel in the opening around a neutral central position and two end positions.

According to the invention, the reduction mechanism is located kinematically between the motor pinion and the pin. The reduction mechanism comprises at least one gear wheel mounted on at least one shaft. More specifically, the reduction mechanism comprises a stepped-pinion wheel and a toothed-sector pinion.

According to the invention, the stepped-pinion wheel and the toothed-sector pinion each extend in a plane orthogonal to the axis X1. This reduction mechanism architecture makes it possible to obtain an especially compact actuator.

More specifically, the stepped-pinion wheel comprises a first pinion and a second pinion, the first pinion is coupled to the motor pinion and the second pinion is coupled to the toothed-sector pinion, the stepped-pinion wheel is mounted on a shaft extending along an axis X2 offset radially with respect to the axis X1 of the shaft of the electric motor. Preferably, the stepped-pinion wheel is in one piece, the first pinion and the second pinion are coaxial.

According to the invention, the toothed sector of the pinion extends in an angular range of between 90° and 180°, preferably between 100° and 120°. As a variant, the toothed sector of the pinion may extend to 360°. The toothed-sector pinion is mounted on a shaft extending along an axis X3 offset radially with respect to the axes X1 and X2.

According to an additional feature of the invention, the pin is mounted offset along an axis X4 at one end of the shaft of the toothed-sector pinion by way of a connecting rod.

According to the invention, the axes X1, X2, X3 and X4 are parallel.

According to one feature of the invention, the actuator is configured to change gear ratios of a motor vehicle transmission, in particular a hybrid transmission.

Advantageously, the actuator according to the invention comprises three electric motors, each electric motor being associated with its own reduction mechanism and its own pin. In this way, the actuator is able to control the changing of six transmission ratios. This is because each electric motor, via its own reduction mechanism, is able to move the associated pin into two end positions, each corresponding to one transmission ratio. In other words, each electric motor, via its own reduction mechanism and its associated pin, is able to control two gear ratios of the transmission of the vehicle. The electric actuator according to the invention with its three electric motors is advantageous in transmissions with six gear ratios.

For example, in the context of the hybrid transmission disclosed in documents WO2015/197927A1 and WO2019/219294A1, the first electric motor of the actuator according to the invention may be linked to two gear ratios associated with the electric machine whereas the second electric motor of the actuator according to the invention may be linked to two gear ratios of the combustion engine, for example gear ratios 1 and 3, and the third electric motor of the actuator according to the invention may be linked to two other gear ratios of the combustion engine, for example gear ratios 2 and 4.

BRIEF DESCRIPTION OF THE DRAWINGS

Other features and advantages of the invention will become apparent upon reading the following text of exemplary embodiments explained in detail, with reference to the appended Figures.

DETAILED DESCRIPTION

Figure 1:
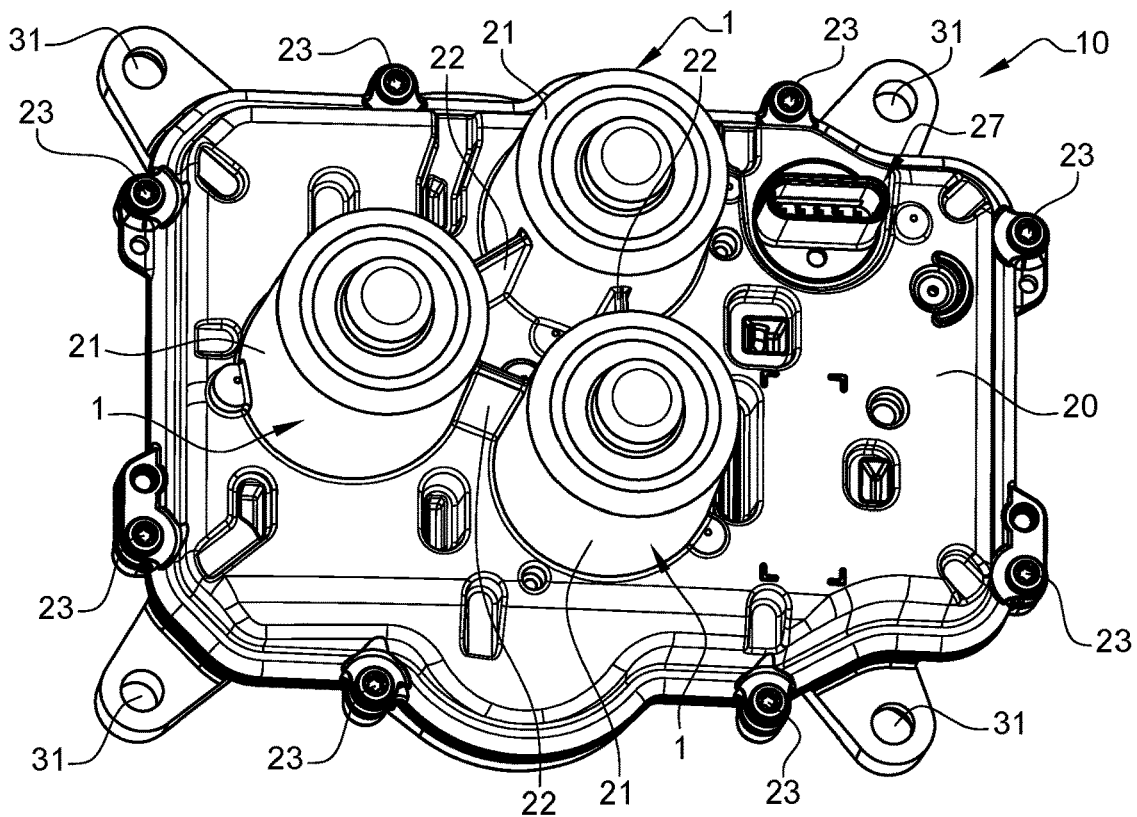
FIG. 1 shows a bottom view of the actuator according to the invention.

FIG. 1 shows an actuator 10 according to the invention. The actuator 10 is formed by two main parts, specifically a housing 20 and a cover 30 in which multiple elements are received. The focus of this FIG. 1 is the housing 20 of the actuator 10. The housing 20 is made of metal, such as aluminium or an aluminium alloy, for example. As a variant, the housing 20 may be made of an injection-mouldable plastics material. The function of the housing 20 is to accommodate the electric motors 1 in the dedicated recesses 21. The housing 20 thus forms a housing common to the electric motors 1.

In a first embodiment of the invention, three electric motors 1 are received in three respective recesses 21. The recesses 21 of the electric motors 1 are produced with a complementary shape to the shape of the electric motors. Reinforcements 22 in the form of ribs are provided between each recess 21 to stiffen the housing 20.

The housing 20 also incorporates an electric connector 27 in order to supply power to the electric motors 1 and all of the electric components necessary for the operation of the actuator 10.

The housing 20 is joined to the cover 30 by way of fixing screws 23 located on the periphery of the housing 20 and of the cover 30.

Figure 2:
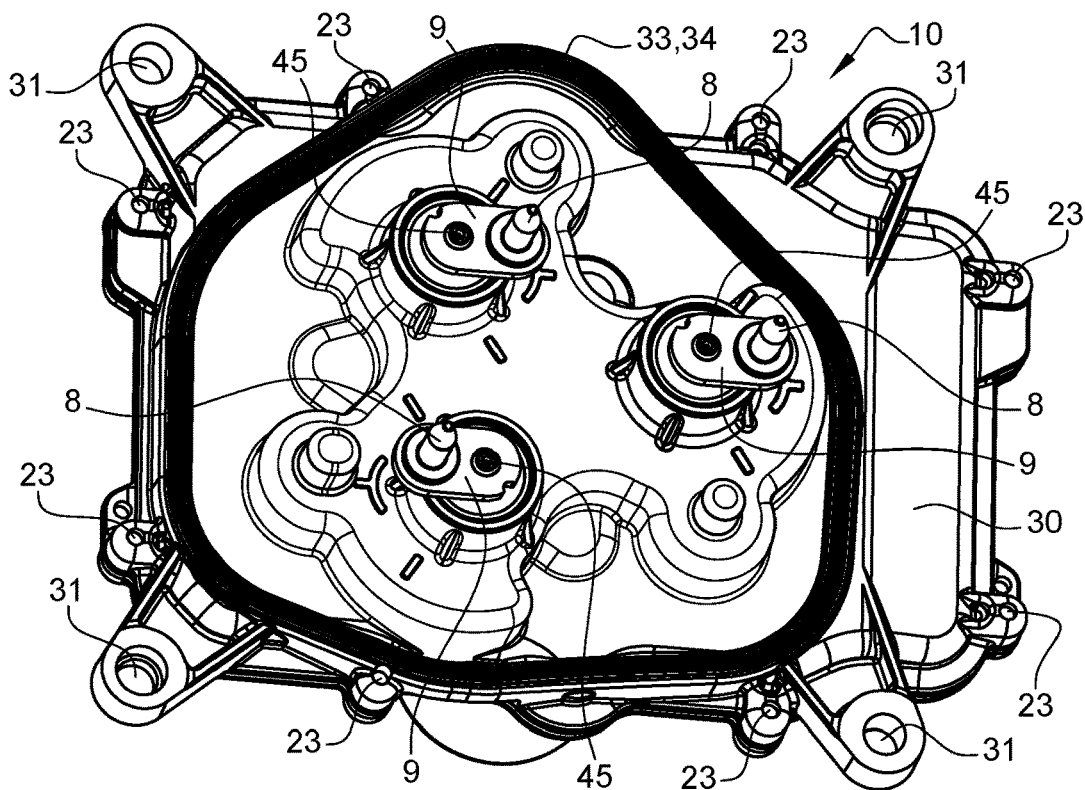
FIG. 2 shows a top view of the actuator according to the invention.

The cover 30 of the actuator 10 can be seen in FIG. 2. The cover 30 is made of metal, such as aluminium or an alloy, for example. As a variant, the cover 30 may be made of an injection-mouldable plastics material. In the case of the present invention, the housing 20 and the cover 30 are made of die-cast aluminium. The housing 20 or the cover 30 may accommodate a cooling circuit if the surrounding temperatures are excessively high.

The actuator 10 is able to be fixed directly on the transmission of the vehicle, such as the gearbox, for example, by way of fixing means 31, in particular openings in which screws are placed. The outer surface of the cover 30 has a groove 33 in which a seal 34 is positioned in order to ensure leaktightness between the transmission and the cover 30. The elements situated inside the closed contour of the seal 34 are in direct contact with the transmission of the vehicle. In the present case, three pins 8 are each able to be engaged in a movable member of the transmission, linked for example to a fork and/or a claw. The pins 8 are therefore located on the outside of the cover 30. The pins 8 have a shape which interacts with their respective movable member, for example a conical shape.

Each pin 8 is able to be engaged in an opening, for example an oblong opening, in a claw so as to bring about the axial movement of a fork in linear travel along the opening under the action of the electric motor. The pin is able to travel in the opening around a neutral central position and two end positions. This actuation kinematics is described in the published document WO2018/146393A1.

Figure 3:
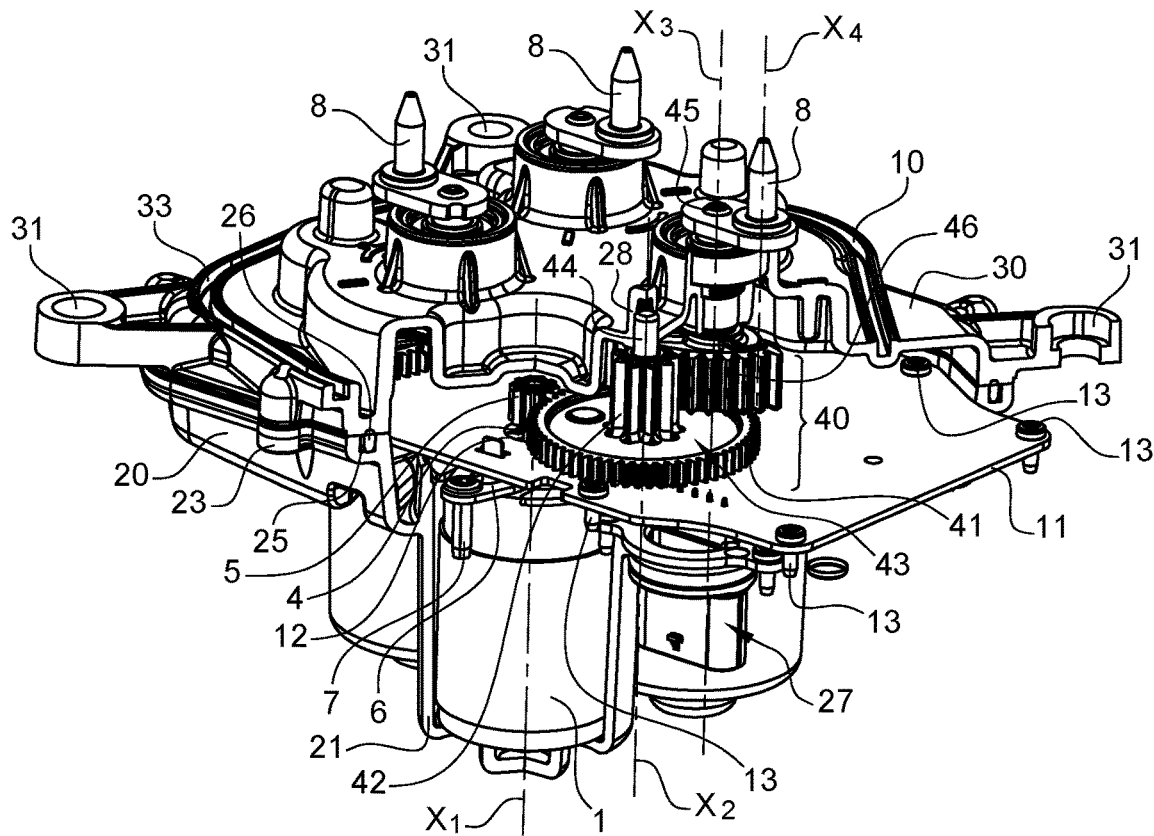
FIG. 3 shows a perspective and partially sectional view of the actuator according to the invention.

FIG. 3 shows the interior of the actuator 10 according to the invention. Although FIG. 3 is a perspective and partially sectional view focused on a single electric motor 1 and its associated kinematics as far as the pin 8, the three electric motors 1 and the actuation kinematics of the pins 8 are all independent but identical in the actuator 10.

The housing 20 and its recess 21 in which the electric motors 1 are received can therefore be seen in FIG. 3. In order to hold the electric motors 1 fixedly in the housing 20, holding plates 6 are used so as to press the electric motors 1 against the base of their respective recess 21.

The electric motors 1 are DC electric motors and are each constituted by a stator 2 and a rotor 3 mounted on a rotor shaft 4 extending along an axis X1. A motor pinion 5 is fixed to the end of each shaft on the opposite side from the rotor 3 and makes it possible to drive a reduction mechanism 40 formed by the gear wheels 41, 42, 46 that are mounted on the shafts 44, 45.

The reduction mechanism 40 is located kinematically between the motor pinion 5 and the pin 8 and comprises a stepped-pinion wheel 43 and a toothed-sector pinion 46.

The stepped-pinion wheel 43 comprises a first pinion 41 and a second pinion 42, the first pinion 41 is coupled to the motor pinion 5 and the second pinion 42 is coupled to the toothed-sector pinion 46, the stepped-pinion wheel 43 is mounted on the shaft 44 extending along an axis X2 and is offset radially with respect to the axis X1 of the shaft 4 of the electric motor 1. The first pinion 41 has a larger diameter than the second pinion 42. The gear wheels 41, 42, 46 are overmoulded on the shafts 44, 45. The gear wheels 41, 42, 46 are for example made of polyphthalamide reinforced with glass fibres (PPA), having very high stiffness and strength and also resistance to high temperatures and to chemicals. As a variant, the gear wheels may be made of polyamide reinforced with glass fibres (PA).

The stepped-pinion wheel 41, 42, 43 and the toothed-sector pinion 46 each extend in a plane orthogonal to the axis X1.

The toothed sector of the pinion 46 extends in an angular range of between 90° and 180°, preferably between 100° and 120°. The toothed-sector pinion 46 is mounted on the shaft 45 extending along an axis X3 offset radially with respect to the axes X1 and X2. The pin 8 is mounted offset along an axis X4 at one end of the shaft 45 of the toothed-sector pinion 46 by way of a connecting rod 9. This connecting rod 9 is also located on the outside of the cover 30. The axes X1, X2, X3 and X4 are parallel.

A circuit board 11 serving to supply power to the stator 2 and to control each electric motor 1 is located axially along the axis X1 between each electric motor 1 and each motor pinion 5. The housing 20 defines a first volume in which the electric motors 1 and the circuit board 11 are received, thus forming an electronic sub-assembly.

The circuit board 11 is fixed to the housing 20 by way of fixing means 13, in particular screws. The outer contour of the circuit board 11 substantially closely follows the inner contour of the housing 20. The circuit board 11 has three openings 12 of closed contour, through each of which passes the rotor shaft 4 of each electric motor 1.

The circuit board 11 makes it possible to manage the power electronics, the control electronics and the self-diagnosis function. Consequently, all of the functions (detection of the position of the pins 8 for closed-loop control, electric power supply and connection to the bus of the vehicle) can be found on the circuit board. Therefore, the circuit board 11 incorporates all of the electronic components necessary for the operation of the electric actuator, such as rotation sensors 56 facing the shafts 45, for example, in order to determine the position of the pins 8. Moreover, the electric power supply for the motors 1 is close to the electric connector 27. The circuit board 11 is connected to the electric motors 1 by crimp or solder contacts.

The reduction mechanism 40 is received in the cover 30 which defines a second volume. The housing 20 and the cover 30 each have guide means 24, 32 for guiding the shafts 44, 45 of the reduction mechanism 40.

The housing 20 comprises a peripheral groove 25 in which a seal 26 is disposed in order to ensure leaktightness between the housing 20 and the cover 30.

Figure 4:
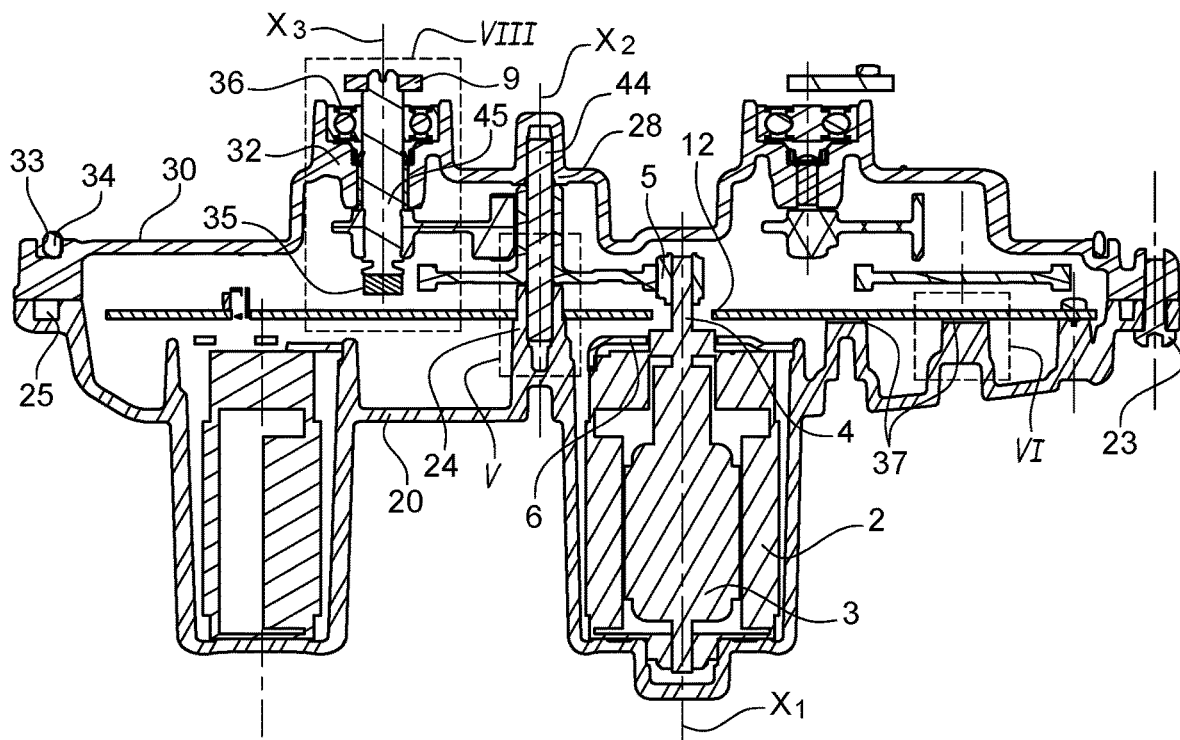
FIG. 4 shows a perspective and sectional view of the actuator according to the invention.

FIG. 4 makes it possible to better depict the kinematics between the electric motor 1, the reduction mechanism 40 and the pin 8.

The housing 20 has a guide means 24 in the form of a blind hole accommodating one end of the shaft 44 of the stepped-pinion wheel 43. The cover 30 also has a guide means 28 in the form of a blind hole accommodating the other end of the shaft 44 of the stepped-pinion wheel 43.

The cover 30 also comprises a through-hole 32 for the passage and guidance of the shaft 45 of the toothed-sector pinion 46.

On its end facing the circuit board 11, the shaft 45 comprises a magnet 35 for detecting the position of the pin 8 by virtue of a sensor 56 fixed on the circuit board 11. The sensor 56 is preferably a Hall effect sensor.

Figure 5A:
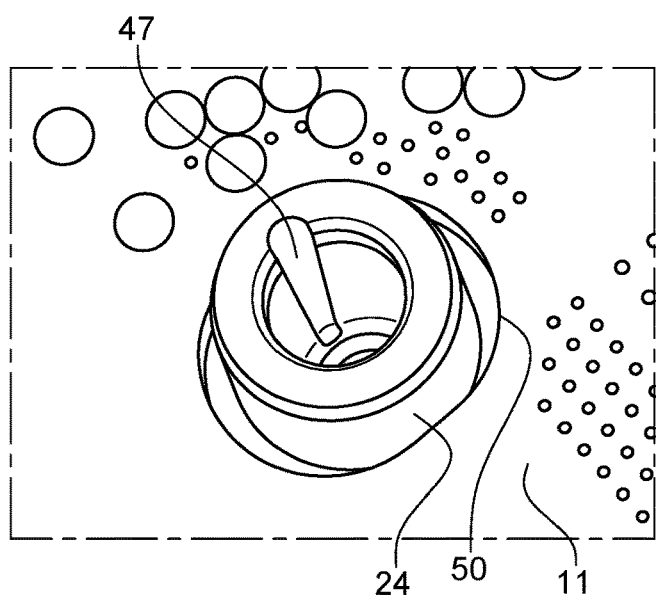
FIG. 5a and FIG. 5b respectively show a perspective view and a sectional view of a guide means for guiding a shaft of the reduction mechanism.
Figure 5B:
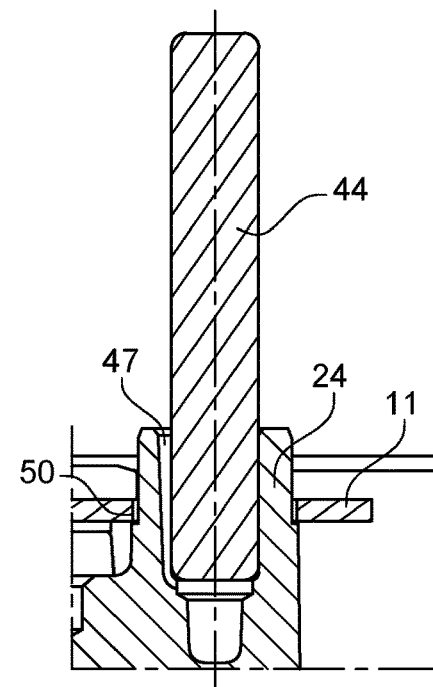

FIGS. 5a and 5b respectively show a perspective view and a sectional view of the guide means 24, in which the shaft 44 of the reduction mechanism 40 is received. The guide means has an axial slot 47 for facilitating the insertion of the shaft 44. This axial slot 47 makes it possible to drive out the air whilst still preventing the formation of an air pocket when the shaft 44 is being inserted into the guide means 24. The guide means 28 may also have such an axial slot. The circuit board has an opening 50 of closed contour through which the guide means 24 passes. The guide means 24 has a shoulder 55 against which the circuit board bears. The guide means 24 serves both to guide the reduction mechanism in rotation and also as a means for centring the circuit board 11 in the housing 20.

Figure 6:
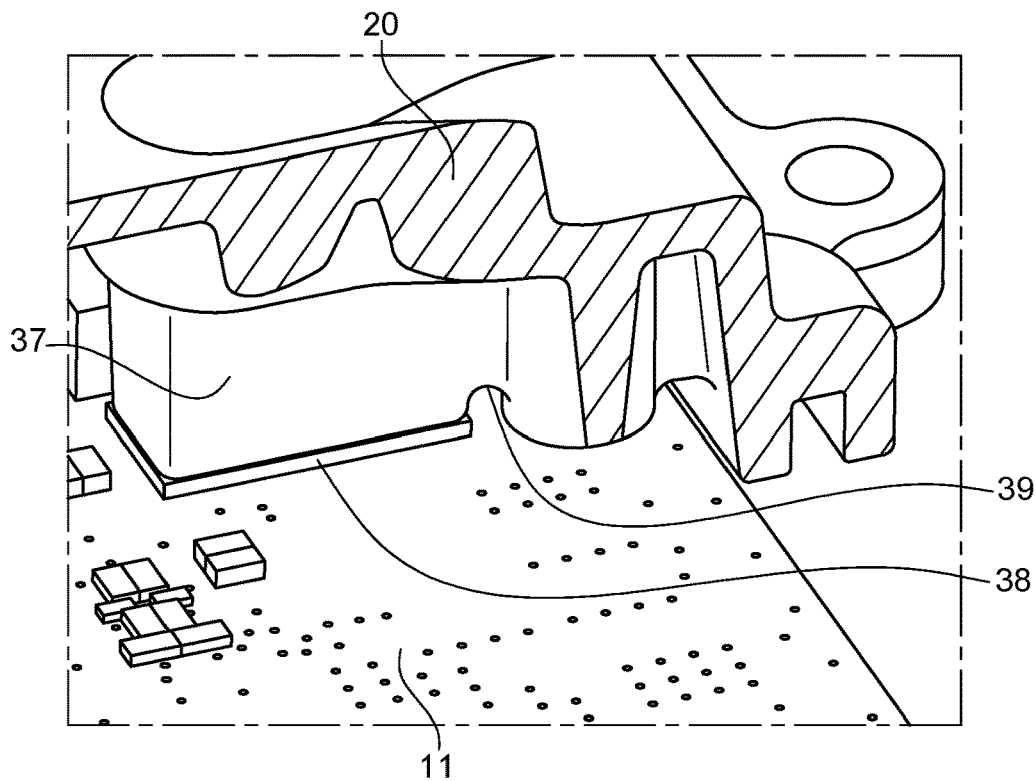
FIG. 6 shows a perspective view of the contact between the circuit board and the housing.

FIG. 6 shows the circuit board 11 in contact with pins 37 of the housing 20 in order to dissipate the heat generated by the circuit board 11. Thermal paste 38 is positioned between the pins 37 and the circuit board 11 in order to improve the transfer of heat energy from the circuit board 11 to the housing 20 which, by virtue of its material, dissipates the heat. A channel 39 is provided on the periphery of the pins 37 in order to recover the excess thermal paste 38.

Figure 7:
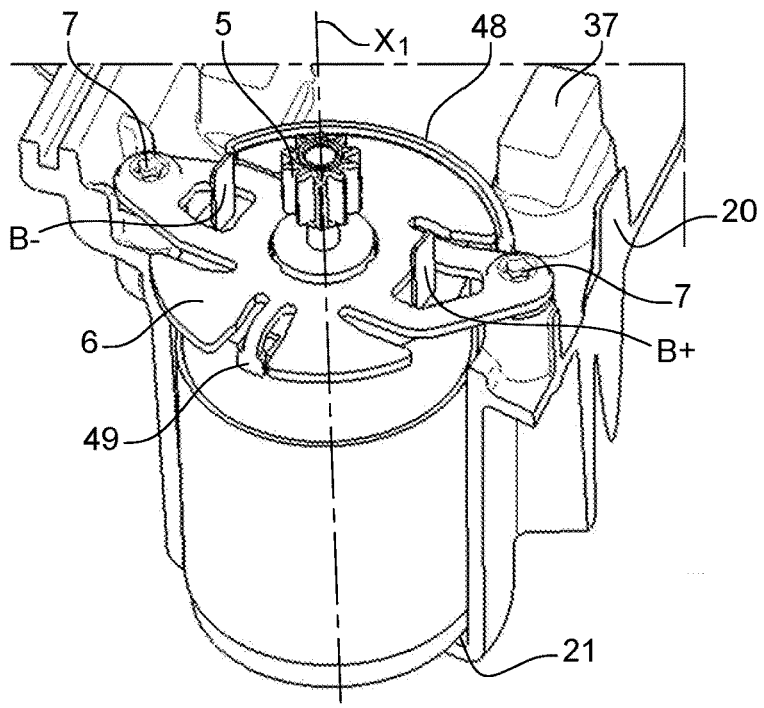
FIG. 7 shows a cutaway perspective view of a holding plate for an electric motor.

FIG. 7 shows the positioning of one of the electric motors 1 and it being held in position in its dedicated recess 21. During operation, the electric motor 1 is subject to acceleration and inertia, which means that it is necessary to correctly position and hold it in its recess 21. The electric motor 1 must also be correctly oriented to allow conduction via the terminals B+, B− with the circuit board 11 and thus to avoid the risk of polarity reversal. The terminals B+, B− are in clamping contact with the circuit board 11, which can be seen in particular in FIG. 10. The electric motor 1 must also be correctly centred to ensure correct operation of the reduction mechanism 40. The holding plate 6 performs all of these functions. This holding plate 6 makes it possible to press the electric motor 1 against the base of the recess 21. The holding plate 6 is made of metal, preferably a metal which makes a spring function possible. The holding plate 6 is fixed to the housing 20 by way of fixing means 7, in particular screws. The housing 20 comprises a rib 48 in the form of a circular arc made for the purpose of centring the holding plate 6 with respect to the housing 20, the holding plate 6 having a substantially complementary shape to the rib 48. The holding plate 6 also comprises a curved tab 49 in order to index the holding plate 6 and the electric motor 1, the curved tab 49 being directed towards the electric motor 1.

Figure 8:
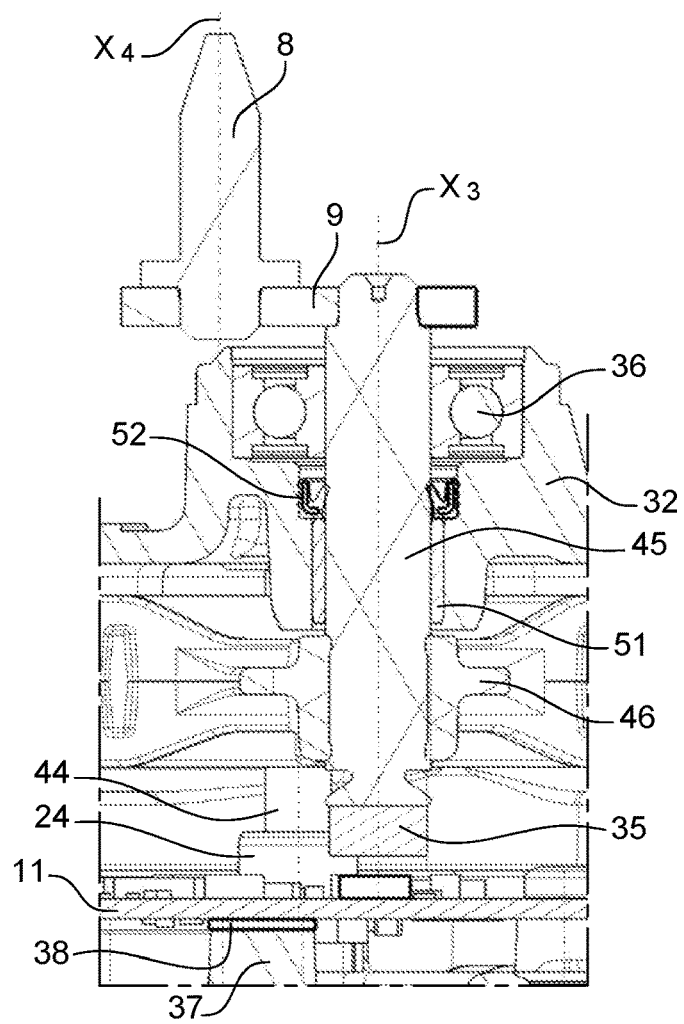
FIG. 8 shows a sectional view of a guide means for guiding a shaft of the reduction mechanism.

FIG. 8 shows the guidance of the shaft 45 in greater detail. Because of the high forces and torques for controlling the changing of the gear ratios of the transmission, the guidance of the shaft 45 must be robust. To that end, the shaft 45 is guided in rotation by a rolling bearing 36 and a bearing 51, this making it possible to absorb radial loads. The rolling bearing 36 is a ball bearing and the bearing 51 is a slide bearing.

The guide means 32 is a through-hole and has three bores of different diameters in which the rolling bearing 36, the bearing 51 and a lip seal 52 are mounted.

The rolling bearing 36 is mounted in a first bore in order to guide the shaft 45 of the toothed-sector pinion 46 and the pin 8 mounted on the connecting rod 9 in rotation. The rolling bearing 36 is preferably leaktight in order not to let impurities into the internal volume defined by the housing 20 and the cover 30. The inner race of the ball bearing 36 is mounted on the shaft 45 and the outer race is received in a first bore in the guide means 32.

The inner wall of the bearing 51 is in contact with the shaft 45 and the outer wall is in contact with a second bore in the guide means 32. The bearing 51 is for example an antifriction slide bearing made of a metal-polymer composite. As a variant, the slide bearing may be made of bronze.

The rolling bearing 36 is located on the outer side of the cover 30 and the bearing 51 is located on the inner side of the cover 30.

Axially along the axis X3, a lip seal 52 is positioned in a third bore in the guide means 32 between the ball bearing 36 and the bearing 51. This lip seal 52 makes it possible to make the interior of the actuator leaktight. This is because the actuator 10 is mounted directly on the gearbox of the vehicle, and therefore the pin 8, the connecting rod 9 and the ball bearing 36 are in direct contact with the lubricant of the gearbox. The ball bearing 36 is thus constantly lubricated by the lubricant of the gearbox. In other words, the lip seal 52 makes it possible to separate a damp space, specifically the interior of the gearbox of the vehicle, from a dry space, specifically the interior of the actuator 10. The lip seal 52 is received in a shoulder of the guide means 32. The lip of the seal 52 is in contact with the shaft 45. The lip seal 52 is in contact with one end of the bearing 51.

Figure 9A:
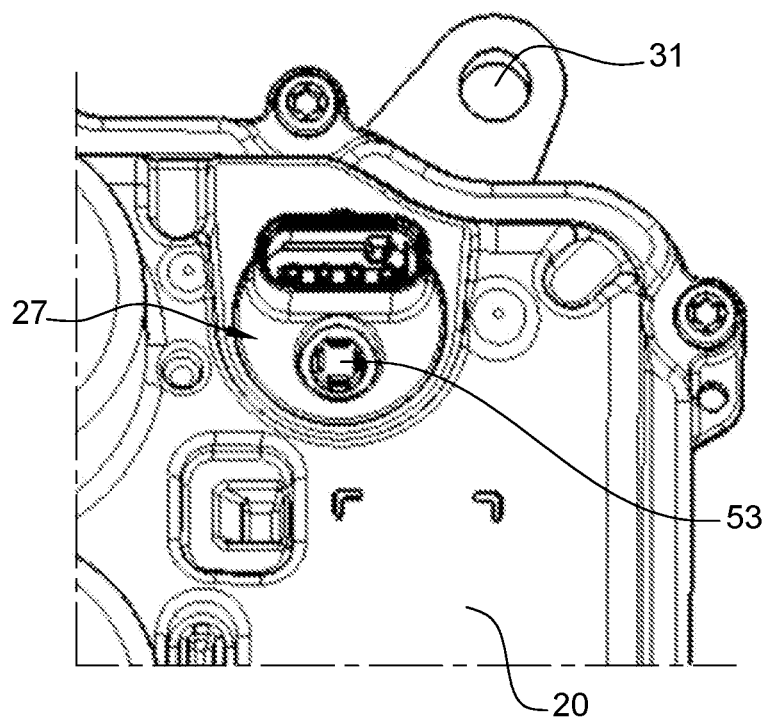
FIG. 9a and FIG. 9b respectively show a perspective view and a sectional view of an electric connector of the actuator according to the invention.
Figure 9B:
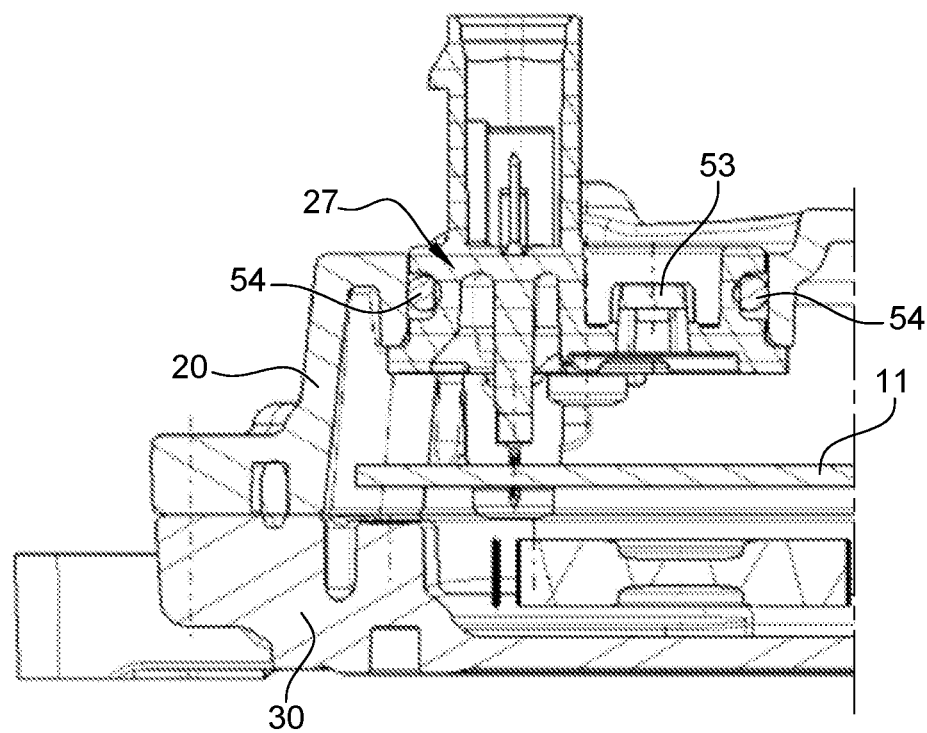

FIGS. 9a and 9b show in detail the electric connector 27 for supplying power to the electric motors 1 and all of the electric components necessary for the operation of the actuator 10. On the side outside the housing 20, the electric connector 27 comprises electrical tracks able to be attached to an external connector. On the side inside the housing 20, the electric connector comprises means for connection to the circuit board 11. The electric connector 27 is made entirely of plastic and is mounted in an opening in the housing 20. The electric connector 27 comprises a membrane 53, more specifically a semipermeable membrane, that is to say that it is permeable to gases, in particular air, and impermeable to liquids, in particular water. The membrane 53 is hydrophobic and, if appropriate, oleophobic, and may have a microporous coating. The membrane 53 may be fixed by various means to the electric connector 27, such as by way of a ring clipped to the electric connector 27. As an alternative, the membrane 53 may be adhesively bonded or soldered to the electric connector. Such a membrane thus makes it possible to limit the risks of condensation and overpressure within the actuator 10, and thus increases the service life whilst still improving the operation of the actuator.

A seal 54, which is visible in FIG. 9b, of the O-ring type is positioned between the electric connector 27 and the housing 20 in order to ensure leaktightness of the actuator. The seal 54 is accommodated in an annular groove of the electric connector 27. The electric connector 27 is screwed or clipped to the housing 20.

Figure 10:
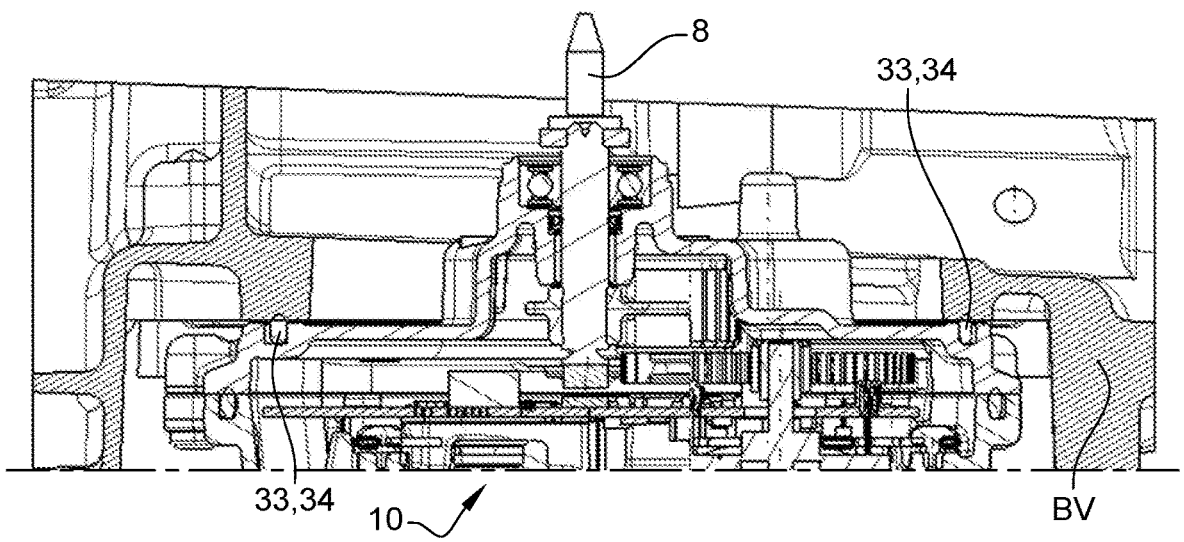
FIG. 10 shows a sectional view of the electric actuator according to the invention fixed on a gearbox of a motor vehicle.

FIG. 10 shows the actuator 10 in a position mounted on the gearbox BV of the vehicle. The leaktightness between the gearbox BV and the actuator 10 is realized by the seal 34 mounted in a groove 33 of the actuator 10, more specifically of the cover 30. The seal 34 is preferably a polymer seal. The use of a polymer seal 34 is preferred to the use of a flat metal joint as is customary in the field.

Figure 11:
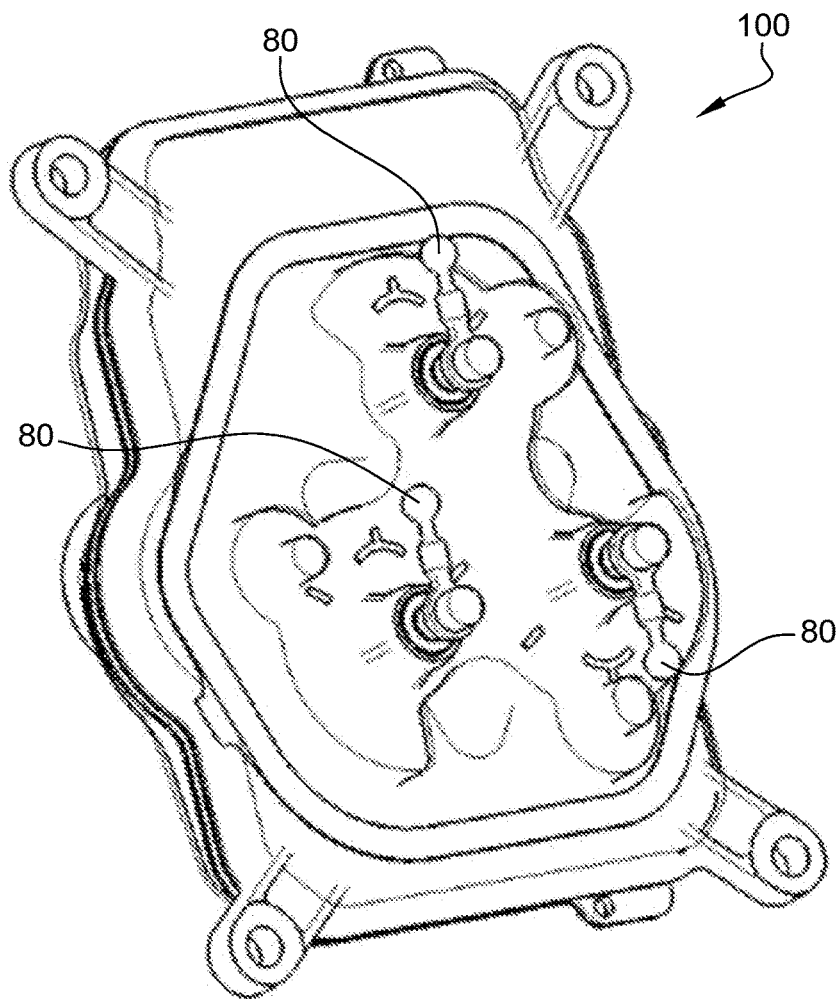
FIG. 11 shows an alternative embodiment of the invention.

FIG. 11 shows a variant embodiment of the actuator 10. The difference from the preceding embodiment is that the pin 80 is spherical and not conical. This allows adaptation to a wider variety of movable members of motor vehicle transmissions.

Figure 12:
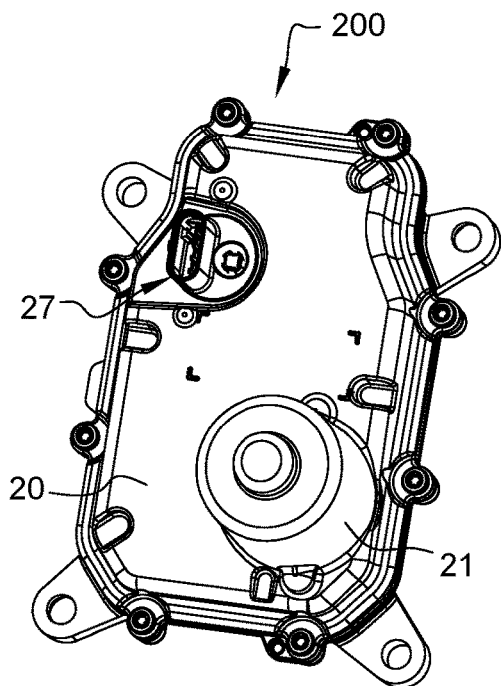
FIG. 12 and FIG. 13 show a variant embodiment of the actuator according to the invention.
Figure 13:
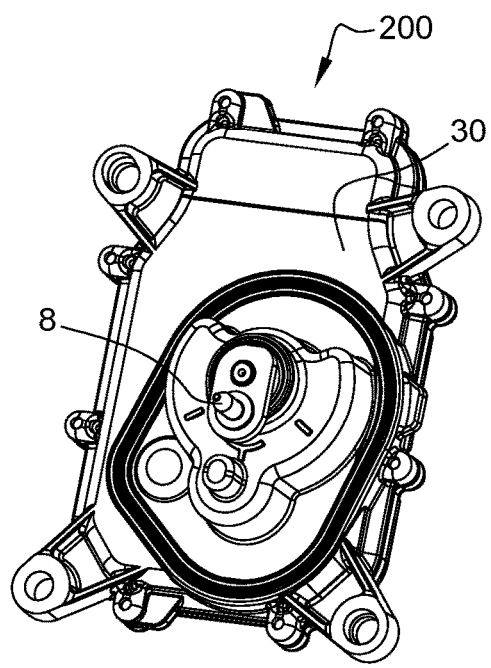
Figure 14:
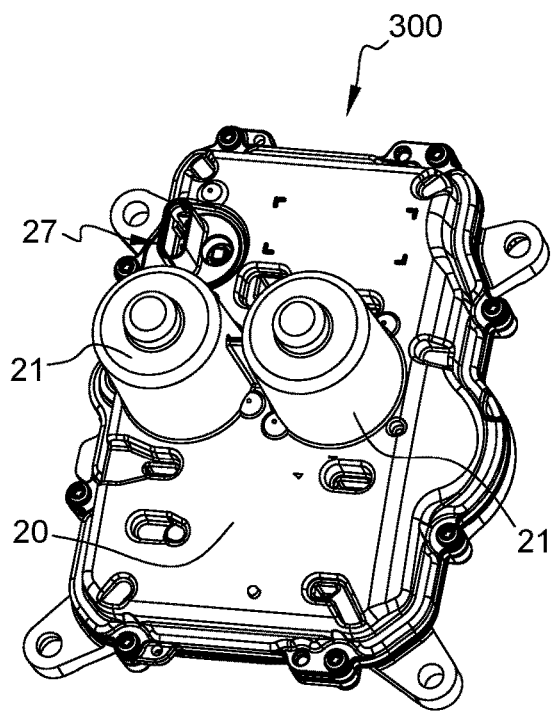
FIG. 14 and FIG. 15 show another variant embodiment of the actuator according to the invention.
Figure 15:
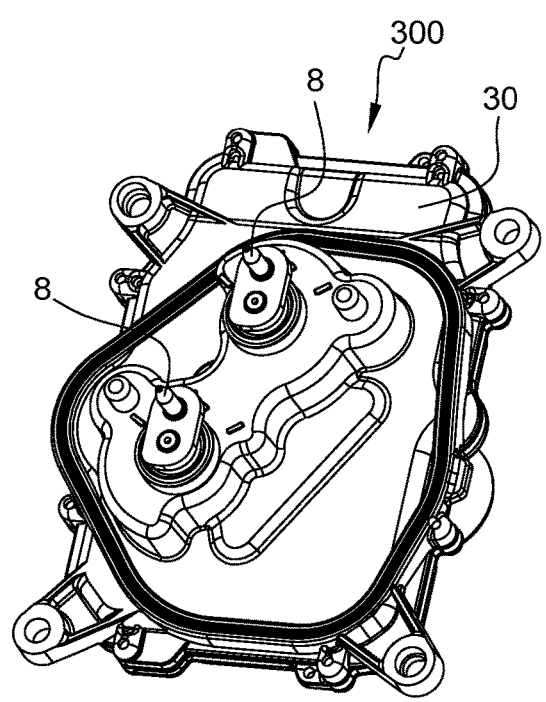

FIGS. 12 to 15 show two other variant embodiments of the actuator 10. Visible in FIGS. 12 and 13 is an actuator 200 in which there is only a single electric motor associated with a pin 8 via a reduction mechanism. Visible in FIGS. 14 and 15 is an actuator 300 in which there are two electric motors associated with two pins 8 via two reduction mechanisms. The operation of the actuators 200, 300 is similar to the operation of the actuator 10; only the numbers of electric motors, reduction mechanisms and pins differ between the embodiments.

Such an electric actuator 10, 100, 200, 300 has a compact structure and little bulk. Furthermore, it is possible to use numerous standard and commercially available elements, such as electric motors and gear wheels. The cost of such an electric actuator is furthermore relatively low and can easily be incorporated into existing transmission systems.

Although the invention has been described in connection with a plurality of embodiments, it is quite obvious that it is in no way limited thereto and that it comprises all the technical equivalents of the means described and combinations thereof where these fall within the scope of the invention.

In the claims, any reference sign between parentheses should not be interpreted as limiting the claim.

The invention claimed is:

1. An actuator for the actuation of at least one movable member of a motor vehicle transmission, said actuator comprising:
    a housing and a cover defining an internal volume in which are received at least one electric motor having a stator and a rotor mounted on a rotor shaft extending along an axis X1, a motor pinion fixed to the opposite end of the rotor shaft to the rotor, a circuit board for supplying power to the stator and for controlling the electric motor, a reduction mechanism driven by the motor pinion, wherein an electrical connector for supplying power to the electric motor is attached to the housing or to the cover, the electrical connector being connected to the circuit board, wherein a seal is positioned directly between the electrical connector and the housing or the cover, the seal being located in an annular groove of the electrical connector, wherein the electrical connector includes a base encircled by the annular groove and positioned within an opening in the housing or cover and a structure extending outward from the base to surround electrical tracks to be attached to an external connector, and wherein said electrical connector incorporates a semipermeable membrane in the base of the electrical connector to allow an exchange of gas between inside the internal volume of the actuator and the external surroundings outside of said housing and of said cover.

2. The actuator according to claim 1, wherein the housing and the cover are made of metal.

3. The actuator according to claim 1, wherein the electrical connector is made of plastic.

4. The actuator according to claim 1, wherein the membrane is clipped on the electrical connector by way of a ring.

5. The actuator according to claim 1, wherein the membrane is adhesively bonded or welded on the electrical connector.

6. The actuator according to claim 1, wherein the electrical connector is screwed or clipped on the housing or the cover.

7. The actuator according to claim 1, wherein the housing and the cover each have guide means for guiding the reduction mechanism.

8. The actuator according to claim 1, wherein the housing comprises a peripheral groove in which a seal is disposed in order to ensure leaktightness between the housing and the cover.

9. The actuator according to claim 1, wherein the actuator is able to be fixed directly on the transmission of the vehicle and wherein the outer surface of the cover has a groove in which a seal is positioned in order to ensure leaktightness between the transmission and the cover of the actuator.

10. The actuator according claim 1, wherein the actuator comprises at least one pin able to be engaged in the movable member of the transmission.

11. The actuator according to claim 10, wherein the reduction mechanism comprises at least one gear wheel mounted on at least one shaft and is located kinematically between the motor pinion and the pin.

12. The actuator according to claim 11, wherein the reduction mechanism comprises a stepped-pinion wheel and a toothed-sector pinion.

13. The actuator according to claim 1, wherein said actuator is configured to change gear ratios in a hybrid vehicle transmission.

14. The actuator according to claim 2, wherein the electrical connector is made of plastic.

15. The actuator according to claim 2, wherein the membrane is clipped on the electrical connector by way of a ring.

16. The actuator according to claim 2, wherein the membrane is adhesively bonded or welded on the electrical connector.

17. The actuator according to claim 2, wherein the electrical connector is screwed or clipped on the housing or the cover.

18. The actuator according to claim 2, wherein the housing and the cover each have guide means for guiding the reduction mechanism.

* * * * *